D. E. SOMES.
Curing Food.
No. 32,009.
Patented April 9, 1861.
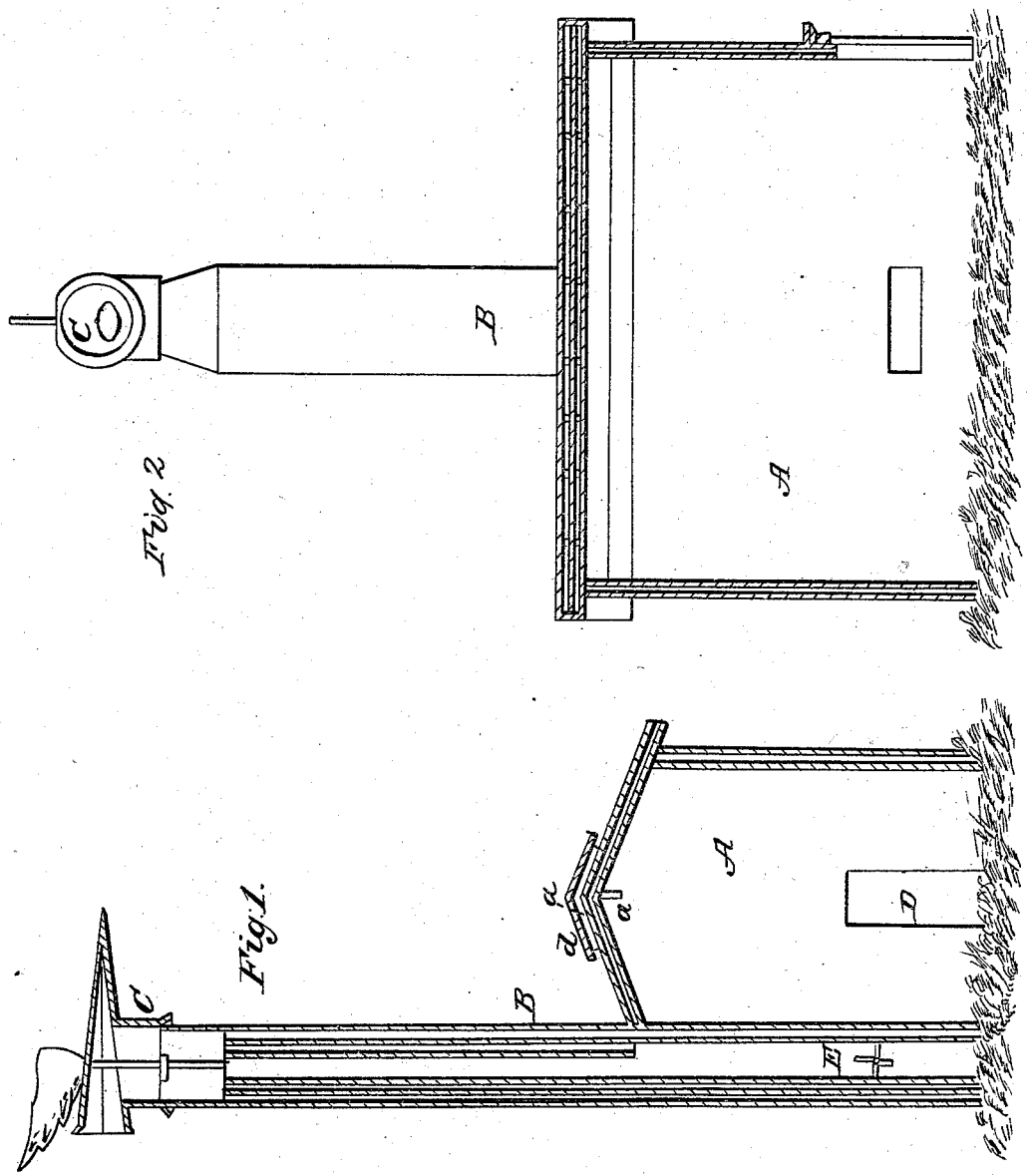
Witnesses
A. A. Yeatman
Inventor
D. E. Somes

UNITED STATES PATENT OFFICE.

D. E. SOMES, OF BIDDEFORD, MAINE.

METHOD FOR PRESERVING MEAT.

Specification of Letters Patent No. 32,009, dated April 9, 1861.

*To all whom it may concern:*

Be it known that I, DANIEL E. SOMES, of Biddeford, Maine, have invented certain new and useful Improvements in Curing Meats and other Articles of Food and Hides, &c.; and I do hereby declare that the following is a full, clear, and exact description of the same, reference being had to the accompanying drawings and to the letters of reference marked thereon.

In the annexed drawings, Figure 1 represents a vertical section of the building. Fig. 2 represents a side elevation.

In the figures, A represents the buildings whose walls are provided with one or more air spaces as seen in order to prevent the penetration of warmth from without. This building is provided with an air duct B, the walls of which are also provided with one or more air spaces for a similar purpose. Upon the top of the air duct is secured a weather cock of any approved construction. Within the air duct is secured a fan blower E, which is set in motion in any convenient manner, and which serves to draw or force a current of air down the air duct into the building.

*a a a* represent a series of openings cut in the top of the building for either the escape or entrance of air. These openings are protected from rain, &c., by means of a narrow roof *d*, erected over them as seen in Fig. 1.

It is well known that the air is not warmed by the direct rays of the sun, but by the radiation of heat from the surface of the earth. It is also well known that as we ascend from the surface of the earth the atmosphere becomes colder and that this cold air from above is constantly descending and mingling with the warmer air near the surface of the earth. Now, by constructing a building in such a manner as to entirely exclude side currents of warm air near the surface of the earth, and with an air duct to receive cold air from above, it will be readily perceived that the cool air will gradually fall, or will be forced down to displace the warm air in the building, and that the temperature of this building may be regulated by its height or the height of the air duct, because the higher we ascend the colder becomes the atmosphere and this cold air being more dense necessarily falls to displace warmer or more rarified air. The height of the building, as also that of the air duct, may vary from 50 to 100 feet or to any height above this which may be practicable and at the same time desirable. Within this building I propose to cure meats and other articles of food, as well as hides, &c., at all seasons of the year and in any latitude. When animals are killed and their carcasses thrown into this building, much animal heat will be given out from them, and a strong current of air, which is produced by the fan, is very necessary for the purpose of carrying away this heat and cooling the bodies.

The air taken from a great height by and through the air duct is much purer and better adapted to the purposes of curing meats than air taken from nearer the surface; it is also drier. It has been ascertained by chemists that the air is filled with floating microscopic germs and Pasteur, in making experiments, has found that the air contained fewer of these germs in proportion to its elevation in the atmosphere. As evidence that these germs promote decomposition and putrefaction, it is sufficient to state that in the city of Paris, France, where the air abounds with them to more than an ordinary degree, it is almost impossible to amputate a limb and perform a successful cure. Undoubtedly the presence of organic matter near the surface of the earth tends to promote decomposition, and hence is one great necessity for using a higher and purer air in curing meats, &c.

Moisture and heat are great promoters of decomposition, but heat, as we know from the experiments and practice in curing meats in South America and other warm countries, has less to do with decomposition than moisture. In some parts of South America the air is drier and purer and the heat greater than in this country. Now by this process of bringing pure dry air and at the same time cool air down this air duct I am enabled to cure meats with more certainty and to much better advantage than can be done in the usual way.

Having thus fully described my invention, what I claim as new, and desire to secure by Letters Patent, is—

The within described mode of curing meats, &c., by cutting off side currents of air and introducing into the building a cooler, a drier, and a purer air than that near the surface of the earth, substantially as and for the purpose herein specified.

In witness that I claim the foregoing I have hereunto set my hand this 11th day of Jany., 1861.

D. E. SOMES.

Witnesses:
C. M. ALEXANDER,
A. A. YEATMAN.